US007978855B2

(12) United States Patent
Cho et al.

(10) Patent No.: US 7,978,855 B2
(45) Date of Patent: Jul. 12, 2011

(54) METHOD FOR ALLOCATING AUTHORIZATION KEY IDENTIFIER FOR WIRELESS PORTABLE INTERNET SYSTEM

(75) Inventors: Seok-Heon Cho, Iksan (KR); Sung-Cheol Chang, Daejeon (KR); Chul-Sik Yoon, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd., Seoul (KR); Hanaro Telecom, Inc., Seoul (KR)

( * ) Notice: Subject to any disclaimer, the term of this patent is extended or adjusted under 35 U.S.C. 154(b) by 802 days.

(21) Appl. No.: 11/908,211

(22) PCT Filed: Oct. 27, 2005

(86) PCT No.: PCT/KR2005/003593
§ 371 (c)(1),
(2), (4) Date: Sep. 10, 2007

(87) PCT Pub. No.: WO2006/137624
PCT Pub. Date: Dec. 28, 2006

(65) Prior Publication Data
US 2008/0192931 A1    Aug. 14, 2008

(30) Foreign Application Priority Data

Jun. 22, 2005    (KR) .................. 10-2005-0054055

(51) Int. Cl.
*H04L 9/12* (2006.01)
(52) U.S. Cl. ........ 380/270; 380/273; 380/277; 380/283; 380/44; 713/171
(58) Field of Classification Search ................ None
See application file for complete search history.

(56) References Cited

U.S. PATENT DOCUMENTS 6,853,729 B1 *  2/2005  Mizikovsky ............ 380/249
2004/0098586 A1   5/2004  Rebo
(Continued)

FOREIGN PATENT DOCUMENTS

JP        2001-148886 A     5/2001
(Continued)

OTHER PUBLICATIONS

IEEE C802.16e-05/227 "Corrections for the PMK ID and the AK ID using the EAP-Session ID", Seokheon Cho, et al.

(Continued)

*Primary Examiner* — Minh Dinh
*Assistant Examiner* — Venkat Perungavoor
(74) *Attorney, Agent, or Firm* — Jefferson IP Law, LLP (57) ABSTRACT

The present invention relates to a method for allocating an authorization key identifier in a wireless portable Internet system. In a privacy key management version 2 (PKMv2) of the wireless portable Internet system, a base station generates PAK identifier, PMK identifier, and authorization key identifier for distinguishing a primary authorization key (PAK) shared by the base station and the subscriber station in an RSA-based authorization, a pairwise master key (PMK) shared by the base station and the subscriber station in an EAP-based authorization, and authorization keys generated by the PAK and the PMK. The base station transmits PAK identifier, PMK identifier, and authorization key identifier to the subscriber station and shares them with the subscriber station. Therefore, the base station and the subscriber station may easily distinguish more than 2 authorization-related keys. In addition, it is possible to transmit the signal message efficiently in the radio channel by reducing the sizes of the PAK identifier, PMK identifier, and authorization key identifier.

21 Claims, 7 Drawing Sheets

U.S. PATENT DOCUMENTS

| | | |
|---|---|---|
| 2004/0158716 A1 | 8/2004 | Turtiainen |
| 2004/0168054 A1 | 8/2004 | Halasz |
| 2004/0172536 A1 | 9/2004 | Malville |
| 2005/0271209 A1* | 12/2005 | Sahasrabudhe et al. ...... 380/270 |
| 2005/0289347 A1* | 12/2005 | Ovadia .......................... 713/171 |

FOREIGN PATENT DOCUMENTS

| | | |
|---|---|---|
| JP | 2002-324052 A | 11/2002 |
| JP | 2003-259417 A | 9/2003 |
| KR | 1020050000481 A | 1/2005 |
| KR | 1020050041864 A | 5/2005 |
| KR | 1020050064717 A | 6/2005 |

OTHER PUBLICATIONS

IEEE C802.16e-05/227r3 "Corrections for the PMK ID and the AK ID using the EAP-Session ID", Seokheon Cho, et al.

* cited by examiner

| Parameter | Size | Usage |
|---|---|---|
| Primary AK (PAK) | 160 bits | A key yielded from the RSA-based authorization. |
| PAK Sequence Number | 8 bits | PAK sequence number, when the RSA-based authorization is achieved. |
| PAK lifetime | 8 bits | PAK lifetime, when the RSA-based authorization is achieved. |
| PMK | 160 bits | A key yielded from the EAP-based authentication |
| PMK lifetime | 8 bits | PMK lifetime, when the EAP-based authorization is achieved and the AAA-key is obtained. The value of PMK lifetime may be transferred from the EAP method or be set by a vendor. |
| AK | 160 bits | The authorization key |
| AK Sequence Number | 8 bits | AK sequence number |
| AK lifetime | | AK lifetime – when this expires, MS's Re-authorization Key process is needed. |
| H/CMAC_KEY_U | 160 bits/128 bits | The key which is used for signing UL management messages. |
| H/CMAC_PN_U | 32 bits | Used to avoid UL replay attack on management messages – when this expires re-authentication is needed. |
| H/CMAC_KEY_D | 160 bits/128 bits | The key which is used for signing DL management messages. |
| H/CMAC_PN_D | 32 bits | Used to avoid DL replay attack on management messages – when this expires re-authentication is needed. |
| KEK | 160 bits | Used to encrypt TEK or GKEK from the BS to the SS. |

| Parameter | Size | Usage |
|---|---|---|
| Primary AK (PAK) | 160 bits | A key yielded from the RSA-based authorization. |
| PAK Sequence Number | 4 bits | PAK sequence number, when the RSA-based authorization is achieved. The 2 least significant bits are the sequence counter, and the two most significant bits are set to 0. |
| PAK lifetime | 8 bits | PAK lifetime, when the RSA-based authorization is achieved. |
| PMK | 160 bits | A key yielded from the EAP-based authentication |
| PMK Sequence Number | 4 bits | PMK sequence number, when the EAP-based authorization is achieved and a key is generated. The 2 most significant bits are the sequence counter, and the two least significant bits are set to 0. |
| PMK lifetime | 8 bits | PMK lifetime, when the EAP-based authorization is achieved and the AAA-key is obtained. The value of PMK lifetime may be transferred from the EAP method or may be set by a vendor. |
| AK | 160 bits | The authorization key |
| AKID | 64 bits | AKID = Dot16KDF(AK, AK SN\|SSID\|BSID\|"AK",64) |
| AK Sequence Number | 4 bits | Sequence number of root keys (PAK and PMK) for the AK. This value is the 2 least significant bits of the PAK sequence number concatenated with the 2 least significant bits of the PMK sequence number. If AK = f (PAK and PMK), then AK SN = PAK SN + PMK SN If AK = f (PAK), then AK SN = PAK SN If AK = f (PMK), then AK SN = PMK SN |
| AK lifetime | 8 bits | This is the time this key is valid, it is calculated as AK life time = MIN (PAK lifetime, PMK lifetime) - when this expires re-authentication is needed. |
| H/CMAC_KEY_U | 160 bits/128 bits | The key which is used for signing UL management messages. |
| H/CMAC_PN_U | 32 bits | Used to avoid UL replay attack on management messages - when this expires re-authentication is needed. |
| H/CMAC_KEY_D | 160 bits/128 bits | The key which is used for signing DL management messages. |
| H/CMAC_PN_D | 32 bits | Used to avoid DL replay attack on management messages - when this expires re-authentication is needed. |
| KEK | 160 bits | Used to encrypt TEK or GKEK from the BS to the SS. |

METHOD FOR ALLOCATING AUTHORIZATION KEY IDENTIFIER FOR WIRELESS PORTABLE INTERNET SYSTEM

BACKGROUND OF THE INVENTION (a) Field of the Invention

The present invention relates to an authentication method in a wireless portable Internet system, and more specifically, to a method for allocating an authorization key identifier in the wireless portable Internet system.

(b) Description of the Related Art

Wireless portable Internet supports mobility in local area data communication such as in a conventional wireless local access network (LAN) that uses a fixed access point, which is a next-generation communication system. Various standards for the wireless portable Internet have been proposed, and the international standard of the wireless portable Internet has progressed in the IEEE 802.16e. The above-described IEEE 802.16 supports the metropolitan area network (MAN) representing an information communication network covering the LAN and the wide area network (WAN).

To securely provide various traffic data services in a wireless portable Internet system, it is required to perform a security function including authentication and authorization functions. In addition, the above functions are required to guarantee network stability and stability of the wireless portable Internet service. Recently, a privacy key management version 2 (PKMv2) which is security key management protocol has been proposed to provide higher security. In the PKMv2, subscriber station equipment authentication, base station equipment authentication, and user authentication may be performed in a Rivest Shamir Adleman (RSA) authentication method or an extensible authentication protocol (EAP) authentication method. The subscriber station and the base station share an authorization key in the above RSA and EAP authentication methods.

In further detail, a method for allocating an authorization key identifier in a conventional IEEE 802.16 wireless metropolitan area network (MAN) system will be described.

Firstly, in the RSA-based authorization method, when an RSA-based authorization is achieved, the subscriber station and the base station share a primary authorization key (PAK). At this time, an identifier for the shared PAK is sequentially generated by the base station, and is transmitted to the subscriber station. In addition, an authorization key identifier which is an identifier for an authorization key yielded from the PAK has a value that is equal to that of the PAK identifier.

In the EAP-based authorization method, when an EAP-based authorization is achieved, the subscriber station and the base station share a pairwise master key (PMK). When the subscriber station and the base station share the PMK yielded from the EAP-based authorization, an identifier for the shared PMK has a value yielded from an EAP session ID value. In this case, the subscriber station and the base station receive the EAP session ID value from higher EAP protocol In addition, an authorization key identifier which is an identifier for an authorization key generated by the PMK has a value that is generated from the same EAP Session ID value.

While the subscriber station and the base station share the authorization key from the above methods, the subscriber station and the base station respectively have the two PAKs and two authorization keys when re-authentication is performed by the RSA-based authorization method. In this case, since the base station allocates the respective PAK identifier and authorization key identifier, the PAKs may be identified by the two PAK identifiers, and the two authorization keys may be identified by the two authorization key identifiers.

In addition, when the re-authentication is performed by the EAP-based authorization method, the subscriber station and the base station respectively have the two authorization keys. In this case, it is required to identify the two authorization keys by using the authorization key identifiers respectively generated by the subscriber station and the base station with the EAP session ID value. However, since the EAP session ID value used as input data for generating the authorization key identifier by the subscriber station and the base station is not changed even when the EAP-based re-authentication is performed, the new authorization key identifier is equal to the previous authorization key identifier and the new PMK identifier is equal to the previous PMK identifier. Moreover, the subscriber station and the base station respectively have the two PMKs and the two authorization keys, and problematically, these keys may not be distinguished. Therefore, there is a problem in that the two PMKs and the two authorization keys in a re-authentication process may not be distinguished by the PMK identifier and the authorization key identifier used in the EAP-based authorization method.

In addition, with the authorization key identifier of the conventional IEEE 802.16 wireless MAN system-based wireless portable Internet system, there is a problem in that a lot of resources are consumed to transmit medium access control (MAC) messages including the PAK, PMK, and authorization key identifiers since sizes of the identifiers are large.

Therefore, the identifiers for the PAK, PMK, and authorization key shared by the subscriber station and the base station are required to identify respective keys, and the sizes of the identifiers are required to be efficiently reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for easily identifying more than two authorization keys, and allocating an identifier which is efficiently reduced in size.

In an exemplary method performed by a base station according to an embodiment of the present invention, an identifier for identifying an authorization key shared with a subscriber station in a wireless portable Internet system is allocated. In the exemplary method, a) an authentication is performed with the subscriber station and the authorization key is shared with the subscriber station; b) an authorization key identifier for identifying the authorization key is generated, the authorization key identifier is transmitted to the subscriber station, and the authorization key identifier is shared with the subscriber station; c) the authentication is performed with the subscriber station in response to a re-authentication request of the subscriber station and a new authorization key is shared with the subscriber station; and d) another authorization key identifier for identifying the new authorization key is generated, the authorization key identifier is transmitted to the subscriber station, and the authorization key identifier is shared with the subscriber station.

In an exemplary method performed by a subscriber station according to another embodiment of the present invention, an identifier for identifying an authorization key shared with a base station in a wireless portable Internet system is allocated.

In the exemplary method, a) an authentication is performed with the base station and the authorization key is shared with the base station; b) an authorization key identifier for identifying the authorization key is received from the base station and the authorization key identifier is shared with the base station; c) a re-authentication is requested to the base station, the authentication is performed with the base station, and a new authorization key is shared with the base station, and d) another authorization key identifier for identifying the new authorization key is received from the base station and the authorization key identifier is shared with the base station.

In an exemplary method performed by a base station according to a further embodiment of the present invention, an identifier for identifying the authorization key shared with a subscriber station in a wireless portable Internet system is allocated.

In the exemplary method, a) an authentication is performed with the subscriber station and the authorization key is shared with the subscriber station; b) an authorization key identifier for identifying the authorization key is shared with the subscriber station (the authorization key identifier is generated by a predetermined authorization key sequence number that is generated by the base station and is transmitted to the subscriber station); c) the authorization is performed in response to a re-authentication request from the subscriber station and a new authorization key is shared with the subscriber station; and d) a new authorization key identifier for identifying the new authorization key is shared with the subscriber station (the new authorization key identifier is generated by a new authorization key sequence number that is generated by the base station and is transmitted to the subscriber station).

In an exemplary method performed by a subscriber station according to a still further embodiment of the present invention, an identifier for identifying an authorization key shared with a base station in a wireless portable Internet system is allocated.

In the exemplary method, a) an authentication is performed with the base station and the authorization key is shared with the base station; b) an authorization key identifier for identifying the authorization key is shared with the base station (the authorization key identifier is generated by a predetermined authorization key sequence number that is generated by the base station and is transmitted to the subscriber station); c) a re-authentication is requested to the base station, the authentication is performed with the base station, and a new authorization key is shared with the base station; and d) a new authorization key identifier for identifying the new authorization key is shared with the base station (the new authorization key identifier is generated by a new authorization key sequence number that is generated by the base station and is transmitted to the subscriber station).

BRIEF DESCRIPTION OF THE DRAWINGS

FIG. 5 shows a table of parameters related to authorization keys of the PKMv2 in the wireless portable Internet system according to the second exemplary embodiment of the present invention.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
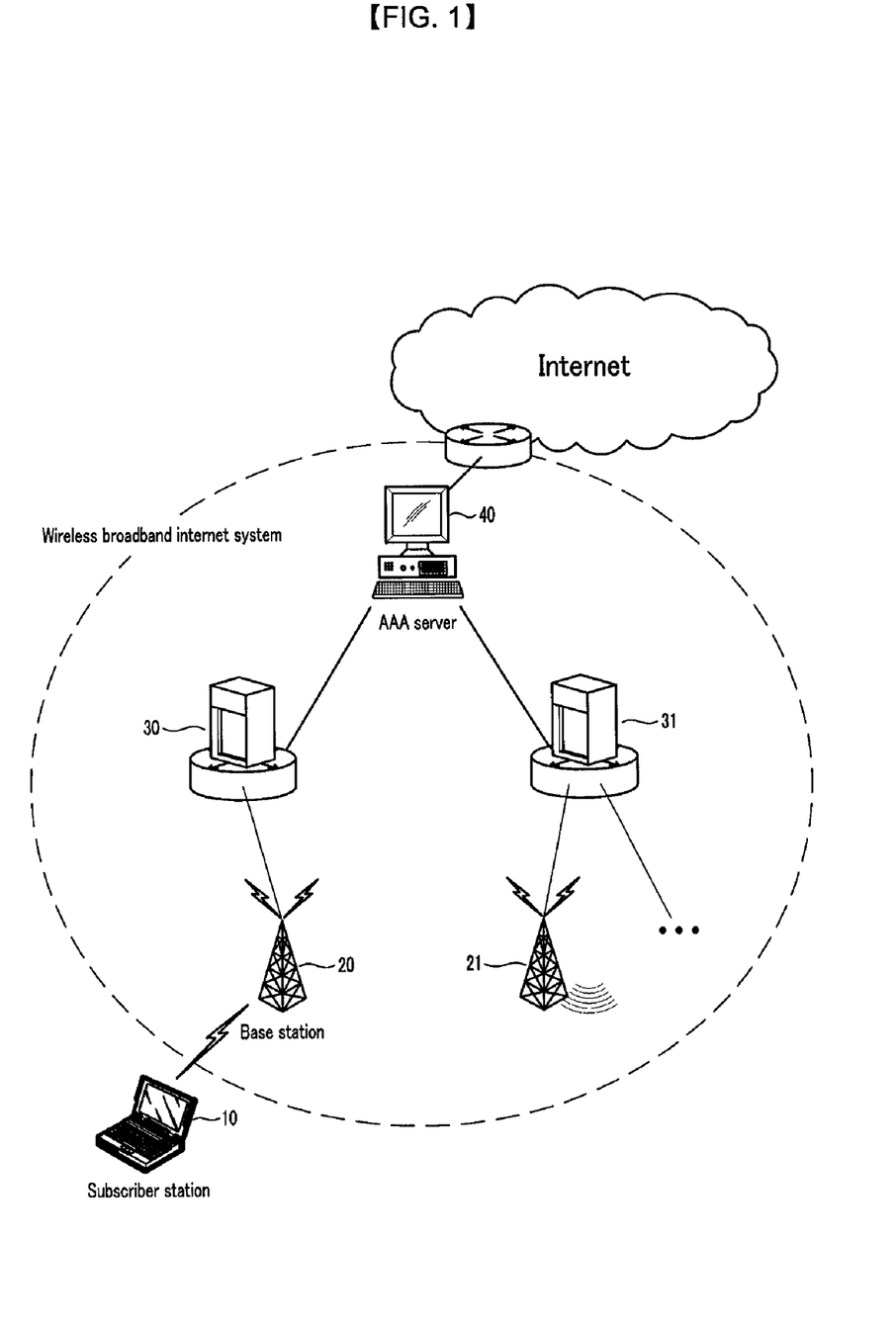
FIG. 1 shows a schematic diagram representing a wireless portable Internet according to an exemplary embodiment of the present invention.

FIG. 1 shows a schematic diagram representing a wireless portable Internet according to an exemplary embodiment of the present invention.

As shown in FIG. 1, a wireless portable Internet system includes a subscriber station 10, base stations 20 and 21 for performing wireless communication with the subscriber station 10, routers 30 and 31 accessed to the base stations 20 and 21 through gateways, and an authentication, authorization, and accounting (AAA) server 40 accessed to the routers 30 and 31 to authenticate the subscriber station 10 and a user.

An authorization policy performed by the subscriber station 10 and the base station 20 according to the exemplary embodiment of the present invention is based on a privacy key management version 2 (PKMv2). Authorization policies based on the PKMv2 are classified into three types. The first type is a Rivest Shamir Adleman (RSA)-based authentication method for performing mutual equipment authorization of the subscriber station 10 and the base station 20, and the second type is an extensible authentication protocol (EAP)-based authentication method for performing the subscriber station equipment authentication and the base station equipment authentication and user authentication by using a higher EAP protocol. In addition, there is a combination of the two methods, in which the RSA-based authorization method for the subscriber station equipment authentication and the base station equipment authentication is performed and then the EAP-based authorization for the user authentication is performed. The third type is an authenticated EAP-based authorization method performed by using a key yielded from the RSA-based authorization method or the EAP-based authorization method after performing the RSA-based authorization or the EAP-based authorization for the subscriber station equipment authentication and the base station equipment authentication.

A method for allocating an authorization key identifier according to a first exemplary embodiment of the present invention, based on the above authorization policies, will now be described.

Figure 2:
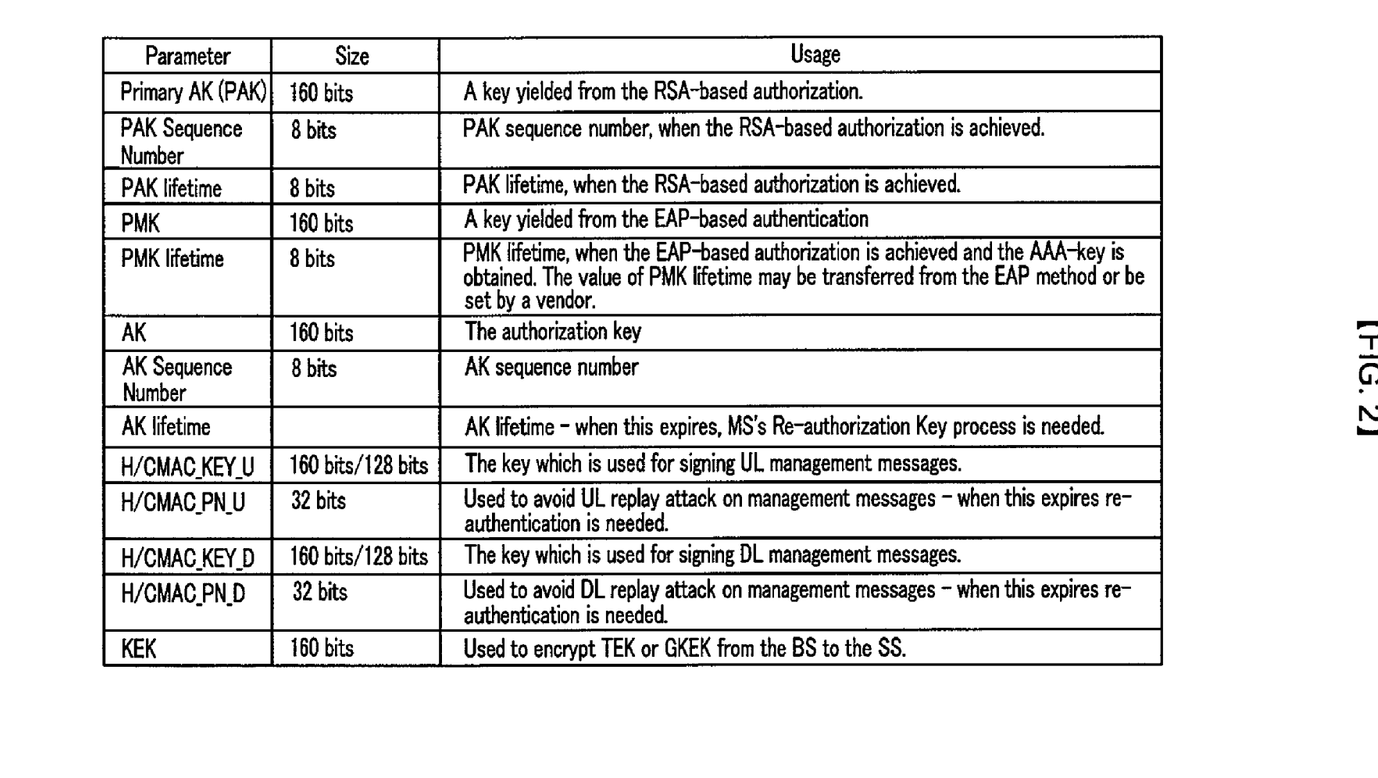
FIG. 2 shows a table representing a configuration of parameters related to the authorization keys in the wireless portable Internet system according to the first exemplary embodiment of the present invention.
Figure 3:
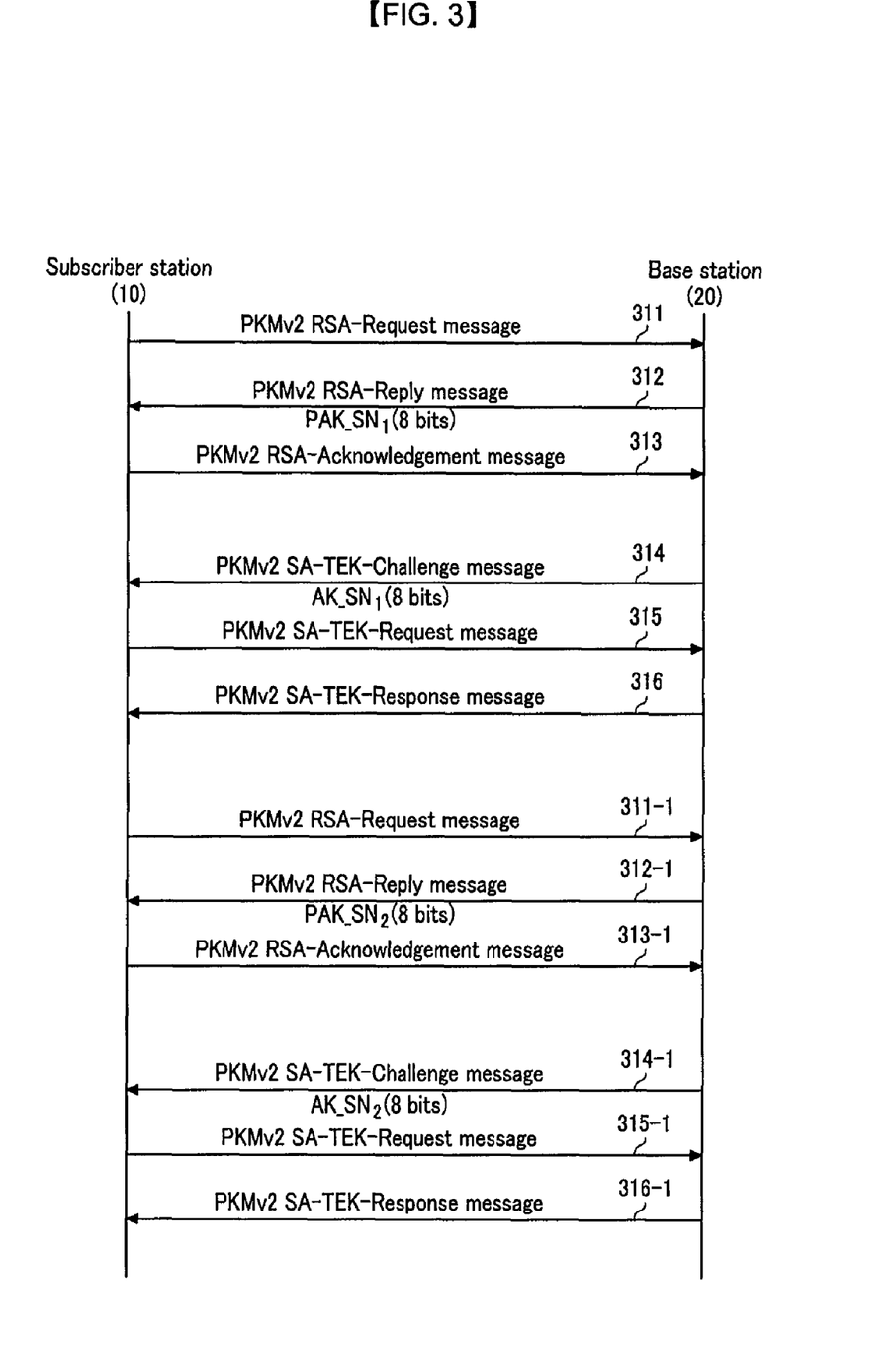
FIG. 3 shows a flowchart representing an authentication process based on the RSA-based authorization method in the wireless portable Internet system according to the first exemplary embodiment of the present invention.

FIG. 2 shows a table representing a configuration of parameters related to the authorization keys in the wireless portable Internet system according to the first exemplary embodiment of the present invention, and FIG. 3 shows a flowchart representing an authentication process based on the RSA-based authorization method in the wireless portable Internet system according to the first exemplary embodiment of the present invention.

Referring to FIG. 2 and FIG. 3, when the subscriber station 10 and the base station 20 use the RSA-based authorization method as the authentication method in the wireless portable Internet system according to the first exemplary embodiment of the present invention, a PKMv2 RSA-Request message 611, a PKMv2 RSA-Reply message 612, and a PKMv2 RSA-Acknowledgement message 613 are used between the subscriber station 10 and the base station 20.

Firstly, the subscriber station 10 adds a certificate of the subscriber station 10 into the PKMv2 RSA-Request message 611 to perform an authentication process according to the RSA-based authorization policy.

The base station 20 receiving the PKMv2 RSA-Request message 611 from the subscriber station 10 performs the equipment authentication of the subscriber station 10, and when the equipment authentication of the subscriber station is successfully achieved, the base station 20 transmits the PKMv2 RSA-Reply message 612 including a certificate of the base station and a pre-primary authorization key (pre-PAK) encrypted with a public key of the subscriber station 10 to the subscriber station 10.

The subscriber station 10 receiving the PKMv2 RSA-Reply message 612 from the base station 20 authenticates the certificate of the base station 20, and when the equipment authentication of the base station 20 is successfully achieved, the subscriber station 10 transmits the PKMv2 RSA-Acknowledgement message 613 to the base station 20. Accordingly, the RSA-based mutual authentication process is finished.

The subscriber station 10 and the base station 20 may share the pre-$PAK_1$ in the above process, respectively generate a $PAK_1$ by using the pre-$PAK_1$, and share the $PAK_1$. In addition, since the subscriber station 10 and the base station 20 generate an authorization key $AK_1$ by using the shared $PAK_1$, they share the same $AK_1$.

Since the base station 20 generates a PAK sequence number $PAK\_SN_1$ for identifying the $PAK_1$, and transmits the PKMv2 RSA-Reply message 612 including the PAK sequence number to the subscriber station 10, the subscriber station 10 and the base station 20 share the PAK sequence number $PAK\_SN_1$. In this case, the size of the PAK sequence number $PAK\_SN_1$ shared by the subscriber station 10 and the base station 20 is 8 bits. That is, the base station 20 generates and distributes the 8 bit-PAK sequence number $PAK\_SN_1$ to the subscriber station 10, and in further detail, the most significant 4 bits among the 8 bit-PAK sequence number $PAK\_SN_1$ are set to be 0 and the remaining least significant 4 bits are set to be valid. In addition, whenever the PAK is updated, the least significant 4 bits are increased by one by the base station 20, and modulo 16 is applied to the least significant 4 bits.

In addition, since the base station 20 transmits a PAK lifetime to the subscriber station 10 while transmitting the PKMv2 RSA-Reply message 612 to the subscriber station 10, the subscriber station 10 and the base station 20 share the PAK lifetime.

After the RSA-based authorization is achieved, a 3-way SA-TEK exchange process is performed between the subscriber station 10 and the base station 20 so that the subscriber station 10 and the base station 20 may be informed of an AK sequence number which is an identifier of the AK, a security association identifier (SA-ID), and algorithms used for each SA.

Firstly, the base station 20 generating the AK in the RSA-based authorization method transmits a PKMv2 SA-TEK-Challenge message 614 including the authorization key sequence number $AK\_SN_1$ and the lifetime to the subscriber station 10.

The subscriber station 10 receiving the PKMv2 SA-TEK-Challenge message 615 transmits a PKMv2 SA-TEK-Request message 315 to inform the base station 20 of supportable encryption algorithms.

Subsequently, the base station 20 receiving the PKMv2 SA-TEK-Request message 615 from the subscriber station 10 informs the subscriber station 10 of the SA-IDs and algorithms corresponding to a supportable primary SA and a plurality of static SAs by transmitting a PKMv2 SA-TEK-Response message 616, and the 3 way SA-TEK exchange process is finished.

Accordingly, the subscriber station 10 and the base station 20 share the AK sequence number $AK\_SN_1$, and the size of the shared AK sequence number $AK\_SN_1$ is 8 bits. That is, the base station 20 generates and distributes the 8 bit-AK sequence number $AK\_SN_1$ to the subscriber station 10, and in further detail, the most significant 4 bits among the 8 bit-AK sequence number $AK\_SN_1$ are set to be 0 and the remaining least significant 4 bits are set to be valid. In addition, whenever the AK is updated, the least significant 4 bits are increased by one by the base station 20, and modulo 16 is applied to the least significant 4 bits.

In addition, the subscriber station 10 is required to perform RSA-based re-authentication before the PAK lifetime shared with the base station 20 expires.

Accordingly, the subscriber station 10 transmits a PKMv2 RSA-Request message 611-1 to the base station 20 to perform the RSA-based re-authentication.

The base station 20 receives a re-authentication request from the subscriber station 10, allocates a pre-$PAK_2$ for generating a new $PAK_2$ and a PAK sequence number $PAK\_SN_2$ for identifying the new $PAK_2$, and transmits the pre-$PAK_2$ and PAK sequence number $PAK\_SN_2$ to the subscriber station 10 by using a PKMv2 RSA_Reply message 612-1.

Subsequently, when the subscriber station 10 receiving the PKMv2 RSA-Reply message 612 from the base station 20 successfully achieves the equipment authentication of the base station 20, the subscriber station 10 transmits a PKMv2 RSA-Acknowledgement message 613-1 to the base station 20, and the RSA-based re-authentication process is finished.

Therefore, since the subscriber station 10 and the base station 20 share the $PAK_2$ and the PAK sequence number $PAK\_SN_2$ generated by performing the re-authentication, and generate an authorization key $AK_2$ by using the $PAK_2$, they may share the same $AK_2$.

The base station 20 sets the PAK sequence number $PAK\_SN_2$ to be 8 bits in a like manner of the PAK sequence number $PAK\_SN_1$. In addition, whenever the RSA-based authorization process is successfully achieved and then the new PAK sequence number $PAK\_SN_1$ is generated, the least significant 4 bits of the PAK sequence number $PAK\_SN_2$ are increased by one and modulo 16 is applied to the least significant 4 bits. That is, when the previous PAK sequence number $PAK\_SN_1$ is '00001001', the newly allocated PAK sequence number $PAK\_SN_2$ becomes '00001010'. When the RSA-based re-authentication is successfully achieved as described above, the subscriber station 10 and the base station 20 respectively have the two PAKs, $PAK_1$ and $PAK_2$, before the previous PAK sequence number $PAK\_SN_1$ expires. Since the subscriber station 10 and the base station 20 have the different PAK sequence numbers $PAK\_SN_1$, $PAK\_SN_2$ for each PAK, they may easily identify the two PAKs.

In addition, after performing the RSA-based re-authentication process, the subscriber station 10 and the base station 20 perform the 3-Way SA-TEK process.

The base station 20 having the generated $AK_2$ by performing the RSA-based re-authentication transmits a PKMv2 SA-TEK-Challenge message 614-1 including an authorization key sequence number $AK\_SN_2$ corresponding to an authorization key identifier for identifying the $AK_2$ to the subscriber station 10.

Subsequently, the subscriber station 10 receiving the PKMv2 SA-TEK-Challenge message 614-1 transmits a PKMv2 SA-TEK-Request message 615-1 to inform the base station 20 of supportable encryption algorithms and then the base station 20 transmits a PKMv2 SA-TEK-Response message 316-1 to inform the subscriber station 10 of the SA-IDs and the algorithms corresponding to a supportable primary SA and a plurality of static SAs, and then the 3-Way SA-TEK process for performing the re-authentication is finished.

In the above process, the subscriber station 10 and the base station 20 share the authorization key sequence number $AK\_SN_2$ for the $AK_2$, and the authorization key sequence number $AK\_SN_2$ is set to be 8 bits in a like manner of the previous authorization key sequence number $AK\_SN_1$. When the base station 20 generates and distributes the authorization key sequence number $AK\_SN_2$ to the subscriber station 10, the least significant 4 bits of the authorization key sequence number $AK\_SN_2$ are increased by one whenever the new authorization key sequence number $AK\_SN_2$ is generated and modulo 16 is applied to the least significant 4 bits. For example, when the previous authorization key sequence number $PAK\_SN_1$ is '00000011', the newly allocated authorization key sequence number $AK\_SN_2$ is '00000100'. When the RSA-based re-authentication is successfully achieved, the subscriber station 10 and the base station 20 respectively have the two AKs, $AK_1$ and $AK_2$, before the previous authorization key sequence number $AK\_SN_1$ expires. Since the subscriber station 10 and the base station 20 have the different AK sequence numbers $AK\_SN_1$ and $AK\_SN_2$ for each AK, they may easily identify the two AKs.

Figure 4:
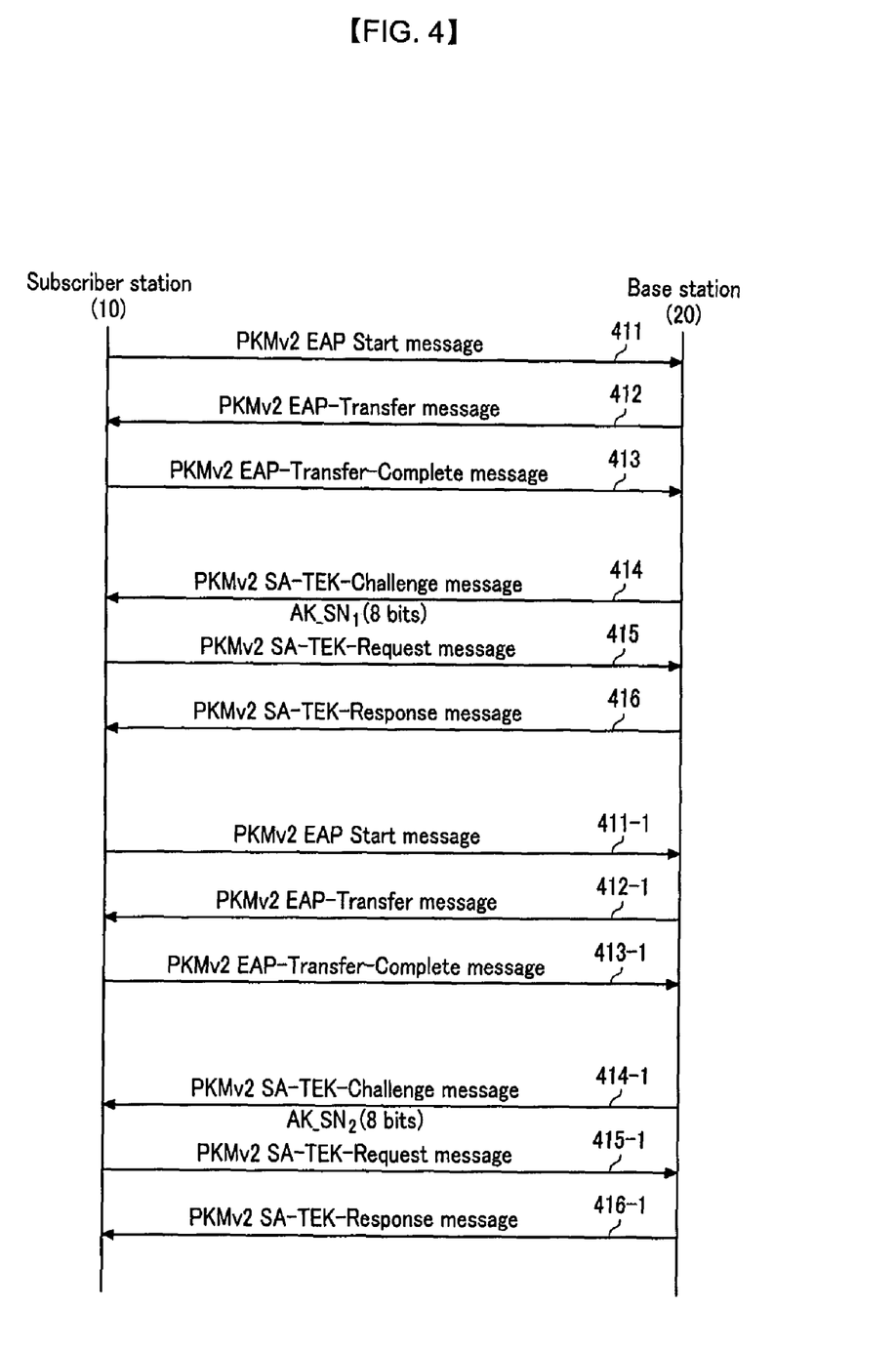
FIG. 4 shows a flowchart representing an authentication process based on the EAP-based authentication method in the wireless portable Internet system according to the first exemplary embodiment of the present invention.

FIG. 4 shows a flowchart representing an authentication process based on the EAP-based authentication method in the wireless portable Internet system according to the first exemplary embodiment of the present invention.

Referring to FIG. 2 and FIG. 4, when the subscriber station 10 and the base station 20 use the EAP-based authorization method in the wireless portable Internet system according to the first exemplary embodiment of the present invention, a PKMv2 EAP-Start message 411 and a PKMv2 EAP-Transfer message 412 are used between the subscriber station 10 and the base station 20. In addition, a PKMV2 EAP-Transfer-Complete message 413 may be selectively used.

Firstly, the subscriber station 10 transmits the PKMv2 EAP-start message 411 to the base station 20 to notify a start of the EAP-based authorization process to the EAP method protocol.

The base station 20 receiving the PKMv2 EAP-start message 411 notifies the start of the EAP-based authorization process to the EAP method protocol of a network. Then, the PKMv2 EAP-Transfer message 412 is transmitted several times between the subscriber station 10 and the base station 20 according to a process of the EAP method protocol. That is, medium access control (MAC) layers of the base station 20 and the subscriber station 10 transmit an EAP payload used in the EAP method to a peer node by using the PKMv2 EAP-Transfer message 412. When the EAP-based authorization is successfully achieved, the subscriber station 10 transmits the PKMV2 EAP-Transfer-Complete message 413 to inform the base station 20 that the EAP-based authorization is finished. The EAP-based authorization process may be finished without transmitting the PKMV2 EAP-Transfer-Complete message 413 in some cases.

When the used EAP method is a key generation protocol such as a transport layer security (EAP-TLS), the subscriber station 10 and the base station 20 may share an $AAA\text{-}key_1$ in the EAP-based authorization process, generate pairwise master keys ($PMK_1$) with the $AAA\text{-}key_1$, and share the $PMK_1$. In addition, since the subscriber station 10 and the base station 20 generate the $AK_1$ by using the shared $PMK_1$, they may share the same $AK_1$.

After the EAP-based authorization is achieved, the 3-Way SA-TEK exchange process is performed between the subscriber station 10 and the base station 20 so that the subscriber station 10 and the base station 20 may be aware of the AK sequence number which is the identifier of the AK, the SA-ID, and the algorithms for each SA.

Firstly, the base station 20 having the generated $AK_1$ in the EAP-based authorization method transmits a PKMv2 SA-TEK-Challenge message 414 including the PMK lifetime and the authorization key sequence number $AK\_SN_1$ to the subscriber station 10.

Accordingly, the subscriber station 10 and the base station 20 may share the PMK lifetime. In this case, since the base station 20 receives the PMK lifetime from the EAP method protocol or uses a value defined by a vendor as the PMK lifetime, the PMK lifetime may be allocated in all cases.

The subscriber station 10 receiving the PKMv2 SA-TEK-Challenge message 414 transmits a PKMv2 SA-TEK-Request message 415 to notify the supportable encryption algorithms to the base station 20.

The base station 20 receiving the PKMv2 SA-TEK-Request message 415 from the subscriber station 10 transmits a PKMv2 SA-TEK-Response message 416 to inform the subscriber station 10 of the SA-IDs and the algorithms corresponding to a supportable primary SA and a plurality of static SAs to the subscriber station 10, and then the 3-Way SA-TEK exchange process is finished.

In the above process, the subscriber station 10 and the base station 20 may share the authorization key sequence number $AK\_SN_1$, and the size of the authorization key sequence number $AK\_SN_1$ is 8 bits. That is, the base station 20 generates and distributes the 8 bit-authorization key sequence number $AK\_SN_1$ to the subscriber station. In further detail, the most significant 4 bits among the 8 bit-authorization key sequence number $AK\_SN_1$ are set to be 0, and the remaining least significant 4 bits are set to be valid. In addition, the least significant 4 bits are increased by one and modulo 16 is applied to the least significant 4 bits.

In addition, the EAP-based re-authentication is required to be performed by the subscriber station 10 and the base station 20 before the shared PMK lifetime expires.

For performing the EAP-based re-authentication, the subscriber station 10 transmits a PKMv2 EAP-start message 411-1 to the base station 20 to notify the start of the EAP-based re-authentication process to the EAP method protocol of the network.

The base station 20 receiving the PKMv2 EAP-start message 411-1 notifies the start of the EAP-based re-authentication process to the EAP method protocol of the network. Subsequently, a PKMv2 EAP-Transfer message 412-1 is transmitted several times between the subscriber station 10 and the base station 20 according to the process of the EAP method protocol. When the EAP-based authorization is successfully achieved, the subscriber station 10 transmits a PKMV2 EAP-Transfer-Complete message 413-1 to the base station 20 to inform the base station 20 that the EAP-based authorization is finished. The EAP-based authorization may be finished without transmitting the PKMV2 EAP-Transfer-Complete message 413-1 in some cases.

In the above process, since the subscriber station 10 and the base station 20 share an AAA-key$_2$, and the subscriber station 10 and the base station 20 respectively generate a new PMK$_2$ by using the AAA-key$_2$ and share the PMK$_2$. In addition, since the subscriber station 10 and the base station 20 generate the new authorization key AK$_2$ by using the shared PMK$_2$, they may share the same AK$_2$. In the EAP-based authorization method, since the previous PMK$_1$ is eliminated and the new PMK$_2$ is used in the higher EAP method protocol when the new PMK$_2$ is generated and shared after the re-authentication is performed, it is not required to additionally provide identifiers for identifying the two PMKs (i.e., PMK$_1$ and PMK$_2$) in the MAC layers of the subscriber station 10 and the base station 20 when characteristics of the EAP method protocol are applied. That is, it is not required to additionally define the PMK identifier.

In addition, the subscriber station 10 and the base station 20 perform the 3-Way SA-TEK exchange process for performing the re-authentication after finishing the EAP-based re-authentication process.

The base station 20 having the generated AK$_2$ by performing the EAP-based re-authentication transmits a PKMv2 SA-TEK-Challenge message 414-1 including the authorization key sequence number AK_SN$_2$ corresponding to the authorization key identifier for identifying the new AK$_2$ and the PMK lifetime to the subscriber station 10.

The subscriber station 10 receiving the PKMv2 SA-TEK-Challenge message 414-1 transmits a PKMv2 SA-TEK-Request message 415-1 to the base station 20 to notify the supportable encryption algorithms to the base station 20 and then the base station 20 transmits a PKMv2 SA-TEK-Response message 416-1 to the subscriber station 10 to inform the subscriber station 10 of the SA-IDs and the algorithms corresponding to a supportable primary SA and a plurality of static SAs, and therefore the 3-Way SA-TEK exchange process is finished.

In the above process, the subscriber station 10 and the base station 20 share the authorization key sequence number AK_SN$_2$ for the new AK$_2$, and the shared authorization key sequence number AK_SN$_2$ is set to be 8 bits in a like manner of the previous authorization key sequence number AK_SN$_1$. In this case, when the base station 20 generates and distributes the authorization key sequence number AK_SN$_2$ to the subscriber station 10, the least significant 4 bits of the authorization key sequence number AK_SN$_2$ are increased by one whenever the new authorization key sequence number AK_SN$_2$ is generated and modulo 16 is applied to the least significant 4 bits. For example, when the previous authorization key sequence number AK_SN$_1$ is '00000010', the newly allocated authorization key sequence number AK_SN$_2$ becomes '00000011'. When the EAP-based re-authentication is successfully achieved as described above, the subscriber station 10 and the base station 20 respectively have the two AKs, AK$_1$ and AK$_2$, before the previous authorization key sequence number AK_SN$_1$ expires. Since the subscriber station 10 and the base station 20 have the different AK sequence numbers AK_SN$_1$ and AK_SN$_2$ for each AK, they may easily identify the two AKs.

As described above, a problem of the defined identifiers of the respective keys (e.g., the PAK identifier and the authorization key identifier) and the PMK lifetime in the PKMv2 of the conventional IEEE 802.16e wireless MAN-based portable Internet service is resolved according to the first exemplary embodiment of the present invention. That is, when the lifetime for key is provided in the EAP method protocol, this lifetime is used as the PMK lifetime, but when the lifetime for key is not provided in the EAP method protocol, the lifetime defined by the vendor is used as the PMK lifetime. Therefore, the EAP-based re-authentication may be efficiently performed.

In addition, since the sizes of the PAK identifier and the authorization key identifier are reduced from 64 bits to 8 bits, the efficiency is increased when the identifier is transmitted in a radio link.

Further, the base station 20 generates the authorization key identifier derived from the PMK not by using the EAP session ID value but by increasing the authorization key identifier by one whenever the authorization key is updated and allocates the authorization key identifier to the subscriber station 10. Therefore, the two authorization keys are distinguished by the authorization key identifier.

It has been described that one of the RSA-based authorization process and the EAP-based authorization process is performed, and hereinafter it will be described that the RSA-based authorization process and the EAP-based authorization process or the authenticated EAP-based authorization process are simultaneously performed.

When the RSA-based authorization process and the EAP-based authorization process or the authenticated EAP-based authorization process are performed, referring to FIG. 3, the base station 20 and the subscriber station 10 may share the PAK$_1$, PAK lifetime and the PAK sequence number PAK_SN$_1$ in RSA-based authorization process 311, 312, and 313 as described above, and subsequently, referring to FIG. 4, they may share the PMK$_1$ in EAP-based authorization process 411, 412, and 413 as described above. In case that the authenticated EAP-based authorization process is performed rather than performing the EAP-based authorization processes 411, 412, and 413, they may share the PMK$_1$ in the authenticated EAP-based authorization process.

The PKMv2 EAP-Start message 411 and the PKMv2 EAP-Transfer-Complete message 413 as an optional message are used in the authenticated EAP-based authorization process. A PKMv2 Authenticated-EAP-Transfer message including a message authentication function is used rather than using the PKMv2 EAP-Transfer message 412 of the EAP authentication process. Since the authorization key AK$_1$ is generated by combining the shared PAK$_1$ and PMK$_1$, the subscriber station 10 and the base station 20 may share the AK$_1$. In this case, the size of the PAK sequence number PAK_SN$_1$ shared by the subscriber station 10 and the base station 20 is 8 bits, the most significant 4 bits are set to 0, and the least significant 4 bits are set to be valid. However, there is no PMK identifier.

Subsequently, referring to FIG. 3 and FIG. 4, the base station 20 generates the authorization key sequence number AK_SN$_1$ in the 3-Way SA-TEK exchange process and allocates the AK_SN$_1$ to the subscriber station 10. In this case, the size of the authorization key sequence number AK_SN$_1$ shared by the subscriber station 10 and the base station 20 is 8 bits, the most significant 4 bits are set to be 0, and the least significant 4 bits are set to be valid.

The subscriber station 10 and the base station 20 may share the PAK lifetime in the RSA-based authorization process, and share the PMK lifetime in the 3-Way SA-TEK exchange process.

Since the PAK lifetime and the PMK lifetime have separate values when the RSA-based authorization process and the EAP-based authorization process or the authentication EAP-based authorization process are concurrently performed as describes above, the RSA-based re-authentication process or the EAP-based re-authentication process may be independently performed.

When the RSA-based re-authentication process is performed before the PAK lifetime expires, the subscriber station 10 and the base station 20 may share a new $PAK_2$ and a PAK sequence number $PAK\_SN_2$ in the RSA-based re-authentication process, share the new authorization key sequence number $AK\_SN_2$ in the 3-Way SA-TEK exchange process subsequently performed after the RSA-based re-authentication process, and use the existing shared $PMK_1$ to generate and share a new authorization key $AK_2$.

In addition, the EAP-based re-authentication process is performed before the PMK lifetime expires, the subscriber station 10 and the base station 20 share the new $PMK_2$ in the EAP-based re-authentication process, share the new authorization key sequence number $AK\_SN_2$ in the 3-Way SA-TEK exchange process that is subsequently performed after the EAP-based re-authentication process, and use the existing shared $PAK_1$ and PAK sequence number $PAK\_SN_1$ to generate and share the new authorization key $AK_2$.

When the various re-authentication processes are performed as described above, the two PAKs, $PAK_1$ and $PAK_2$, may be identified by using the PAK sequence numbers $PAK\_SN_1$ and $PAK\_SN_2$, and the two authorization keys $AK_1$ and $AK_2$ may be identified by using the authorization key sequence numbers $AK\_SN_1$ and $AK\_SN_2$. Here, according to characteristics of the higher EAP authentication protocol, the existing $PMK_1$ is discarded to use the new $PMK_2$ when the new $PMK_2$ is generated in the EAP-based re-authentication process. Accordingly, the PMK identifier is not necessary since the subscriber station 10 and the base station 20 share only one PMK at any moment when the characteristic of the higher EAP authorization protocol is applied to the MAC layers of the subscriber station 10 and the base station 20. In this case, the sizes of the PAK sequence number $PAK\_SN_2$ and the authorization key sequence number $AK\_SN_2$ are 8 bits.

The re-authentication processes may be easily understood by referring to FIG. 3 and FIG. 4, and therefore detailed descriptions thereof will be omitted.

As described above, the problems of the respective key identifiers and the PMK lifetime defined in the PKMv2 of the conventional IEEE 802.16e wireless MAN-based portable Internet service are resolved according to the first exemplary embodiment of the present invention. That is, when the lifetime for key is provided in the EAP method protocol, this lifetime is used as the PMK lifetime, but when the lifetime for key is not provided in the EAP method protocol, the lifetime defined by the vendor is used as the PMK lifetime. Therefore, the EAP-based re-authentication may be efficiently performed.

In addition, the efficiency is increased when the identifier is transmitted in the radio link since the sizes of PAK identifier and authorization key identifier are reduced from 64 bits to 8 bits.

A method for allocating the authorization key identifier according to a second exemplary embodiment of the present invention will now be described.

Figure 6:
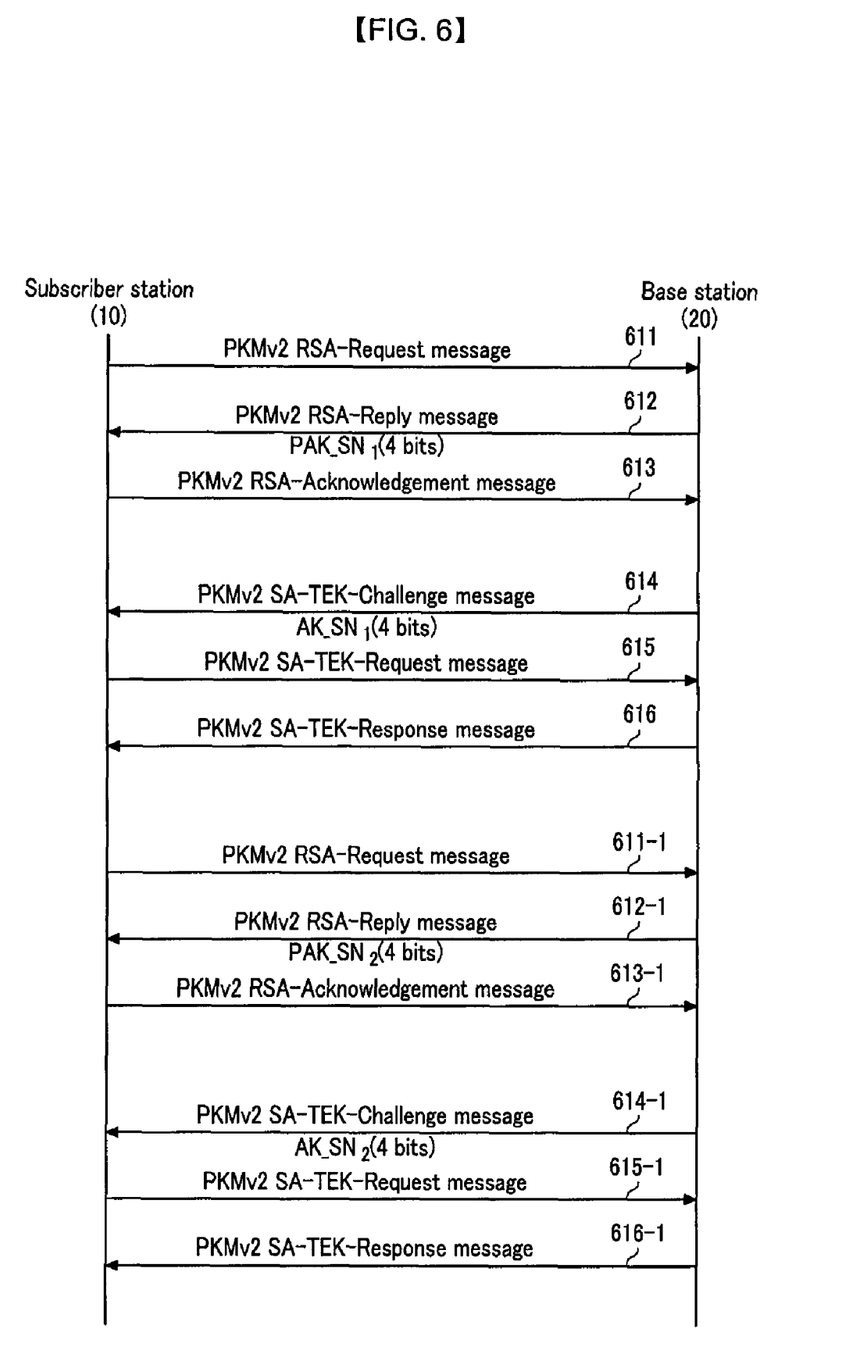
FIG. 6 shows a flowchart representing an authentication process according to the RSA-based authorization policy in the wireless portable Internet system according to the second exemplary embodiment of the present invention.

FIG. 5 shows a table of parameters related to authorization keys of the PKMv2 in the wireless portable Internet system according to the second exemplary embodiment of the present invention, and FIG. 6 shows a flowchart representing an authentication process according to the RSA-based authorization policy in the wireless portable Internet system according to the second exemplary embodiment of the present invention.

A method for allocating the authorization policy, the authorization keys, and the respective authorization key identifiers according to the second exemplary embodiment of the present invention is similar to that of the first exemplary embodiment of the present invention described with reference to FIG. 2 to FIG. 4, and therefore parts that are different from the first exemplary embodiment of the present invention will be described in the second exemplary embodiment of the present invention.

Referring to FIG. 5 and FIG. 6, when the subscriber station 10 and the base station 20 select an RSA-based authorization method as an authorization policy in the wireless portable Internet system according to the second exemplary embodiment of the present invention, the subscriber station 10 and the base station 20 use a PKMv2 RSA-Request message 811, a PKMv2 RSA-Reply message 812, and a PKMv2 RSA-Acknowledgement message 813 to perform the mutual authentication of the base station 20 and subscriber station 10.

When the authentication of the base station 20 and subscriber station 10 is successfully performed, the subscriber station 10 and the base station 20 may share the pre-$PAK_1$, PAK lifetime, and PAK sequence number $PAK\_SN_1$ by using the PKMv2 RSA-Reply message 812. In addition, since the subscriber station 10 and the base station 20 respectively generate and share the $PAK_1$ by using the pre-$PAK_1$, and generate the authorization key $AK_1$ by using the generated $PAK_1$, they may share the same $AK_1$. In this case, the size of the PAK sequence number $PAK\_SN_1$ shared by the subscriber station 10 and the base station 20 is 4 bits. That is, the base station 20 generates the PAK sequence number $PAK\_SN_1$ as 4 bits and allocates it to the subscriber station 10. In further detail, the most significant 2 bits are set to be 0, and the least significant 2 bits are set to be valid. In addition, whenever the PAK is updated, the least significant 2 bits are increased by one and modulo 4 is applied to the least significant 2 bits.

In addition, the subscriber station 10 and the base station 20 may share the authorization key sequence number $AK\_SN_1$ in the 3-Way SA-TEK exchange process, particularly by using the PKMv2 SA-TEK-Challenge message 814 in a like manner of the first exemplary embodiment of the present invention. However, differing from the first exemplary embodiment of the present invention, the authorization key sequence number $AK\_SN_1$ is allocated to be the same as the PAK sequence number $PAK\_SN_1$ in the second exemplary embodiment of the present invention. That is, the base station 20 uses the allocated PAK sequence number $PAK\_SN_1$ as the authorization key sequence number $AK\_SN_1$ when it generates the authorization key sequence number $AK\_SN_1$ and distributes the $AK\_SN_1$ to the subscriber station 10. Therefore, the size of the authorization key sequence number $AK\_SN_1$ is 4 bits. In further detail, among the 4 bit-authorization key sequence number $AK\_SN_1$, the most significant 2 bits are set to be 0, and the remaining least significant 2 bits are set to be equal to that of the PAK sequence number $PAK\_SN_1$.

Another difference between the first and second exemplary embodiments of the present invention is that an authorization key identifier $AKID_1$ is used rather than using the authorization key sequence number $AK\_SN_1$ to identify the authorization key, and the authorization key identifier $AKID_1$ is generated by using the authorization key sequence number $AK\_SN_1$, the authorization key $AK_1$, a subscriber station MAC address SSID, and a base station identifier BSID which has been shared or known. Since the subscriber station MAC address SSID and the base station identifier BSID are previously noticed, the authorization key identifier $AKID_1$ corresponding to the authorization key $AK_1$ and the authorization key sequence number $AK\_SN_1$ is determined when the authorization key $AK_1$ and the authorization key sequence number $AK\_SN_1$ shared in the RSA-based authorization and 3-Way SA-TEK exchange processes are determined, and therefore the subscriber station 10 and the base station 20 may share the authorization key identifier $AKID_1$.

In a like manner of the first exemplary embodiment of the present invention, before the shared PAK lifetime expires, the subscriber station 10 and the base station 20 perform the RSA-based re-authentication to generate and share the new $PAK_2$, authorization key $AK_2$, and PAK sequence number $PAK\_SN_2$. That is, in the second exemplary embodiment of the present invention, the subscriber station 10 and the base station 20 share the new $PAK_2$, authorization key $AK_2$, and the PAK sequence number $PAK\_SN_2$ after performing the authentication of the base station 20 and the subscriber station 10 by using PKMv2 RSA-Request message 811-1, a PKMv2 RSA-Reply message 812-1, and a PKMv2 RSA-Acknowledgement message 813-1 in the like manner of the first exemplary embodiment of the present invention, and therefore detailed descriptions thereof will be omitted.

However, differing from the first exemplary embodiment of the present invention, the PAK sequence number $PAK\_SN_2$ shared by the subscriber station 10 and the base station 20 in the re-authentication process is allocated to be 4 bits in the second exemplary embodiment of the present invention. That is, the most significant 2 bits are set to be 0, and the remaining least significant 2 bits are set to be valid. In addition, when the new PAK sequence number $PAK\_SN_2$ is generated after the RSA-based authorization process is successfully achieved, the least significant 2 bits are increased by one and modulo 4 is applied to the least significant 2 bits. For example, when the previous PAK sequence number $PAK\_SN_1$ is '0001', the newly allocated PAK sequence number $PAK\_SN_2$ becomes '0010'. As described above, when the RSA-based re-authentication is successfully achieved, the subscriber station 10 and the base station 20 respectively have the two PAKs, $PAK_1$ and $PAK_2$, before the previous PAK sequence number $PAK\_SN_1$ expires. In this case, the two PAKs are easily identified since the subscriber station 10 and the base station 20 have the different PAK sequence numbers $PAK\_SN_1$ and $PAK\_SN_2$ for the respective PAKs.

In addition, in a like manner of the first exemplary embodiment of the present invention, the subscriber station 10 and the base station 20 perform the 3-Way SA-TEK exchange process for the re-authentication to generate and share the new authorization key sequence number $AK\_SN_2$ in the second exemplary embodiment of the present invention. That is, the subscriber station 10 and the base station 20 use the PKMv2 SA-TEK-Challenge message 814-1, the PKMv2 SA-TEK-Request message 815-1, and the PKMv2 SA-TEK-Response message 816-1 to share the new authorization key sequence number $AK\_SN_2$ in a like manner of the first exemplary embodiment of the present invention, and therefore detailed descriptions thereof will be omitted.

However, differing from the first exemplary embodiment of the present invention, the authorization key sequence number $AK\_SN_2$ newly shared by the subscriber station 10 and the base station 20 in the re-authentication process is allocated to be equal to the PAK sequence number $PAK\_SN_2$ in the second exemplary embodiment of the present invention. That is, among the authorization key sequence number $AK\_SN_2$, the most significant 2 bits are set to be 0, and the least significant 2 bits are set to be equal to that of the PAK sequence number $PAK\_SN_2$.

As described above, a new authorization key identifier $AKID_2$ for identifying the authorization key $AK_2$ is generated by the authorization key $AK_2$ and the authorization key sequence number $AK\_SN_2$ newly shared in the re-authentication process, so that the subscriber station 10 and base station 20 may share the authorization key identifier $AKID_2$. When the RSA-based re-authentication is achieved as described above, the subscriber station 10 and the base station 20 respectively have the two authorization keys $AK_1$ and $AK_2$ before the previous authorization key identifier $AKID_1$ expires. In this case, the two authorization keys may be easily identified since they have the different authorization key identifiers $AKID_1$ and $AKID_2$ for the respective authorization keys.

Figure 7:
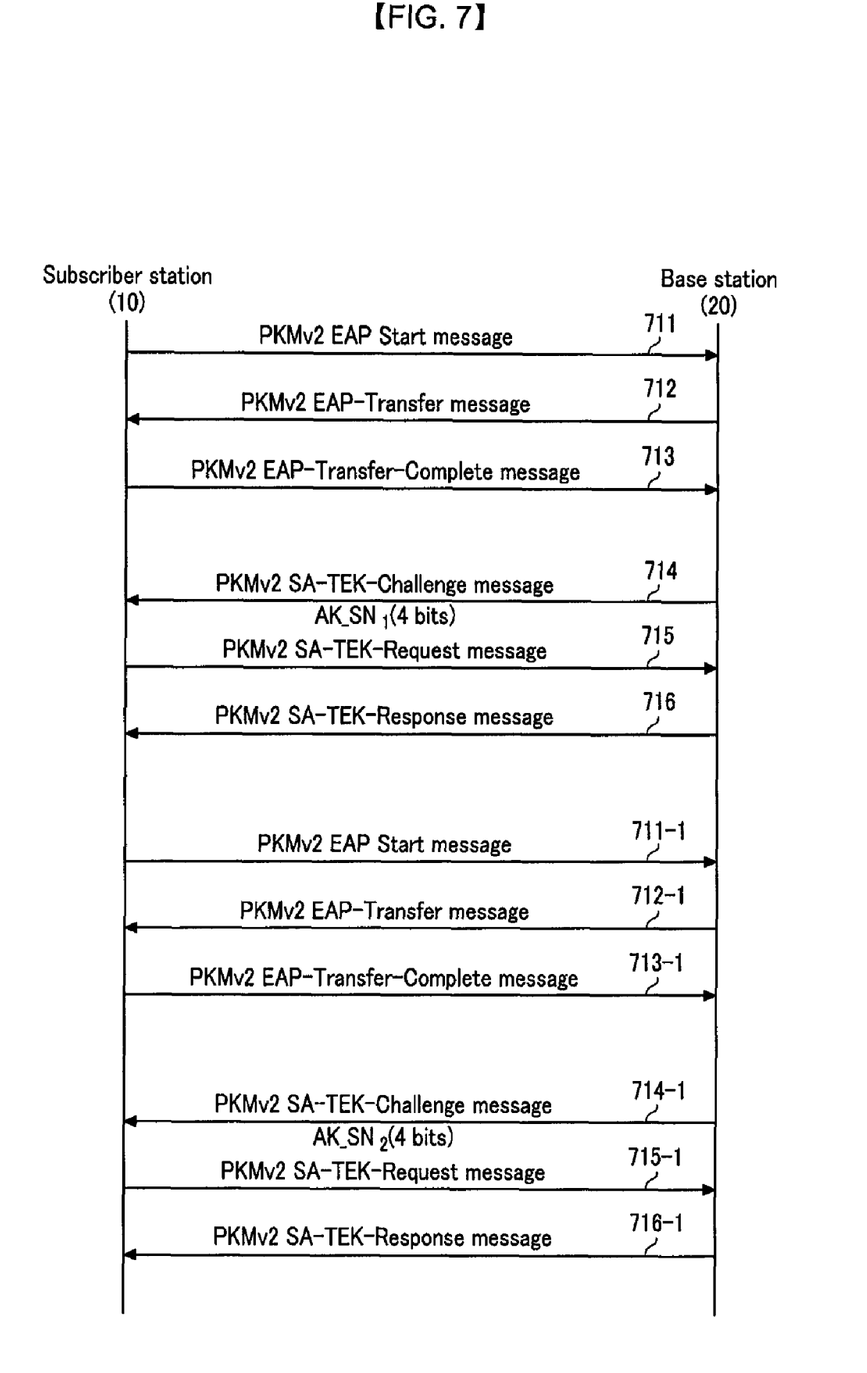
FIG. 7 shows a flowchart representing the authentication process according to the EAP-based authorization policy in the wireless portable Internet system according to the second exemplary embodiment of the present invention.

FIG. 7 shows a flowchart representing the authentication process according to the EAP-based authorization policy in the wireless portable Internet system according to the second exemplary embodiment of the present invention.

Referring to FIG. 5 and FIG. 7, when the subscriber station 10 and the base station 20 select the EAP-based authorization process as an authorization policy in the wireless portable Internet system according to the second exemplary embodiment of the present invention, the subscriber station 10 and the base station 20 use a PKMv2 EAP-Start message 711 and a PKMv2 EAP-Transfer message 712 to perform the authentication of the base station 20 and the subscriber station 10. In addition, a PKMV2 EAP-Transfer-Complete message 713 may be selectively used.

When the above authentication is achieved, the subscriber station 10 and the base station 20 share the $PMK_1$ and the authorization key $AK_1$.

When the PMK is newly generated in the re-authentication process according to the EAP-based authorization policy in the first exemplary embodiment of the present invention, the previous PMK is discarded and the new PMK is left to be used. Accordingly, a PMK sequence number PMK_SN is not defined since there is no case in which two PMKs exist.

In the second exemplary embodiment of the present invention, when the PMK is newly generated in the re-authentication process, the previous PMK is discarded and the new PMK is left to be used in the higher EAP method protocol according to the EAP-based authorization policy. However, the PMK sequence number PMK_SN for identifying the previous PMK and the new PMK is defined since the MAC layers of the subscriber station 10 and the base station 20 store and manage the previous PMK and the new PMK.

Therefore, the base station 20 generates the PMK sequence number $PMK\_SN_1$ for identifying the PMK but does not distribute the PMK sequence number $PMK\_SN_1$ to the subscriber station 10 in the EAP-based authorization process. In this case, the size of the PMK sequence number $PMK\_SN_1$ generated by the base station 20 is 4 bits in a like manner of the PAK sequence number PAK_SN. In further detail, among the 4 bit-PMK sequence number $PMK\_SN_1$, the least significant 2 bits are set to be 0, and the remaining most significant 2 bits are set to be valid, and therefore a used position of the PMK sequence number PMK_SN1 is different from that of the PAK sequence number PAK_SN. In addition, the most significant 2 bits are increased by one by the base station 20 and modulo 4 is applied to the most significant 2 bits, whenever the PMK is updated. This is for preparing a case for performing both the RSA-based authorization and the EAP-based authorization processes, and it will be described later in the specification.

Subsequently, in a similar manner to the RSA-based authorization process described with reference to FIG. 6 according to the second exemplary embodiment of the present invention, the subscriber station 10 and the base station 20 may share the authorization key sequence number $AK\_SN_1$ in the 3-Way SA-TEK exchange process, particularly by using a PKMv2 SA-TEK-Challenge message 714, and a 4 bit value which is equal to the PMK sequence number $PMK\_SN_1$ is allocated as the authorization key sequence number AK_SN1. The base station 20 performs the 3-way SA-TEK exchange process to transmit the PMK sequence number to the subscriber station 10 instead of performing the EAP-based authorization process. The size of the authorization key sequence number $AK\_SN_1$ is 4 bits. In further detail, among the 4 bit-authorization key sequence number $AK\_SN_1$, the least significant 2 bits are set to be 0, and the remaining most significant 2 bits are set to be equal to the PMK sequence number $PMK\_SN_1$.

Here, since the base station 20 allocates the authorization key sequence number $AK\_SN_1$ having an equal value of the $PMK\_SN_1$ to the subscriber station 10 and shares it with the subscriber station 10, the subscriber station knows the PMK sequence number $PMK\_SN_1$ by the authorization key sequence number $AK\_SN_1$ distributed by the base station 20. Accordingly, the subscriber station 10 and the base station 20 may share the PMK sequence number $PMK\_SN_1$.

In addition, differing from the first exemplary embodiment of the present invention, in a like manner of the RSA-based authorization process according to the second exemplary embodiment of the present invention, the authorization key identifier $AKID_1$ is used to identify the authorization key rather than using the authorization key sequence number $AK\_SN_1$. The authorization key identifier $AKID_1$ is generated by using the authorization key sequence number $AK\_SN_1$, the authorization key $AK_1$, the subscriber station MAC address SSID, and the base station identifier BSID. Therefore, in the EAP-based authorization process according to the second exemplary embodiment of the present invention, when the authorization key $AK_1$ and the authorization key sequence number $AK\_SN_1$ are determined, the authorization key identifier corresponding to the $AK_1$ and $AK\_SN_1$ is also determined so as to be shared by the subscriber station 10 and the base station 20.

In addition, the base station 20 transmits the PMK lifetime to the subscriber station 10 by using a PKMv2 SA-TEK-Response message 716 in the 3-way SA-TEK exchange process.

In a like manner of the RSA-based authorization process according to the second exemplary embodiment of the present invention, the subscriber station 10 performs the EAP-based re-authentication to generate and share the new $PMK_2$ and $AK_2$ before the shared PMK lifetime expires. That is, after performing the mutual equipment authentication or the user authentication by using a PKMv2 EAP-Start message 711-1 and a PKMv2 EAP-Transfer message 712-1, the subscriber station 10 and the base station 20 may share the new $PMK_2$ and $AK_2$. At this time, a PKMv2 EAP-Transfer-Complete message 713-1 may be selectively used.

In a like manner of the RSA-based authorization process according to the second exemplary embodiment of the present invention, the subscriber station 10 and the base station 20 perform the 3-Way SA-TEK exchange process for the re-authentication, generate the authorization key sequence number $AK\_SN_2$, and share the $AK\_SN_2$. That is, the subscriber station 10 and the base station 20 use a PKMv2 SA-TEK-Challenge message 714-1, a PKMv2 SA-TEK-Request message 715-1, and a PKMv2 SA-TEK-Response message 716-1 to share the new authorization key sequence number $AK\_SN_2$. In this case, the base station 20 allocates the authorization key sequence number $AK\_SN_2$ newly shared by the subscriber station 10 and the base station 20 in the re-authentication process so that it may have the same value as the PMK sequence number $PMK\_SN_2$. The base station 20 sets the PMK sequence number $PMK\_SN_2$ newly generated in the re-authentication process by the base station 20 to be 4 bits in a like manner of the previous PMK sequence number $PMK\_SN_1$. However, since the EAP-based authorization process has been achieved and the new PMK sequence number $PMK\_SN_2$ has been generated, the most significant 2 bits of the PMK sequence number $PMK\_SN_2$ are increased by one and the modulo 4 is applied to the most significant 2 bits of the new PMK sequence number $PMK\_SN_2$. For example, when the previous PMK sequence number $PMK\_SN_1$ is '0010', the new PMK sequence number $PMK\_SN_2$ becomes '0011'. When the EAP-based re-authentication is achieved, the subscriber station 10 and the base station 20 respectively have the two PMKs $PMK_1$ and $PMK_2$ before the previous PMK sequence number $PMK\_SN_1$ expires. In this case, the two PMKs may be easily identified since the different PMK sequence numbers $PMK\_SN_1$ and $PMK\_SN_2$ are provided for the respective PMKs.

Subsequently, the subscriber station 10 may know the new PMK sequence number $PMK\_SN_2$ by the authorization key sequence number $AK\_SN_2$ shared with the base station 20, and therefore the subscriber station 10 and the base station 20 share the PMK sequence number $PMK\_SN_2$ because the authorization key sequence number $AK\_SN_2$ is equal to the PMK sequence number $PMK\_SN_2$. Therefore, the PMK sequence numbers $PMK\_SN_1$ and $PMK\_SN_2$ for identifying the previous $PMK_1$ and the new $PMK_2$ may be separately provided to be shared.

In addition, the new authorization key identifier $AKID_2$ for identifying the authorization key $AK_2$ is generated by the authorization key $AK_2$ and the authorization key sequence number $AK\_SN_2$ newly shared in the re-authentication process, and therefore it may be shared by the subscriber station 10 and the base station 20. When the EAP-based re-authentication process is achieved as described above, the subscriber station 10 and the base station 20 respectively have the two authorization keys $AK_1$ and $AK_2$ before the previous authorization key identifier $AKID_1$ expires. In this case, the two authorization keys may be easily distributed since the different authorization key identifiers $AKID_1$ and $AKID_2$ are provided for the respective authorization keys.

It has been described that one of the RSA-based authorization process and the EAP-based authorization process is performed, and it will now be described that the RSA-based authorization process and the EAP-based authorization process or the authenticated EAP-based authorization process are performed.

When the RSA-based authorization process and the EAP-based authorization process or the authenticated EAP-based authorization processes are performed, referring to FIG. 6, the base station 20 and the subscriber station 10 may share the $PAK_1$, PAK lifetime, and the PAK sequence number $PAK\_SN_1$ in the RSA-based authorization processes 611, 612, and 613 as described above, and subsequently, referring to FIG. 7, they may share the $PMK_1$ in EAP-based authorization processes 711, 712, and 713 as described above. Here, when the authenticated EAP-based authorization process is performed rather than performing the EAP-based authorization processes 711, 712, and 713, they may share the $PMK_1$ in the authenticated EAP-based authorization process. The PKMv2 EAP-Start message 711 and the PKMv2 EAP-Transfer-Complete message 713 are selectively used in the authenticated EAP-based authorization process. A PKMv2 Authenticated-EAP-Transfer message including a message authentication function is used instead of using the PKMv2 EAP-Transfer message 712 of the EAP authentication process.

Since the authorization key $AK_1$ is generated by combining the shared $PAK_1$ and $PMK_1$, the subscriber station 10 and the base station 20 may share the $AK_1$. In this case, the size of the PAK sequence number $PAK\_SN_1$ shared by the subscriber station 10 and the base station 20 is 4 bits, the most significant 2 bits are set to 0, and the least significant 2 bits are set to be valid.

Subsequently, referring to FIG. 6 and FIG. 7, the base station 20 generates the authorization key sequence number $AK\_SN_1$ in the 3-Way SA-TEK exchange process and allocates the $AK\_SN_1$ to the subscriber station 10. Since the base station 20 has the PAK sequence number $PAK\_SN_1$ in the RSA-based authorization process and the PMK sequence number $PMK\_SN_1$ in the EAP-based authorization process, the authorization key sequence number $AK\_SN_1$ is generated by a sum of the bits of the PAK sequence number $PAK\_SN_1$ and the PMK sequence number $PMK\_SN_1$. That is, different bits are used in the PAK sequence number $PAK\_SN_1$ and the PMK sequence number $PMK\_SN_1$ since the PAK sequence number $PAK\_SN_1$ uses the least significant 2 bits among the 4 bits and the PMK sequence number $PMK\_SN_1$ uses the most significant 2 bits among the 4 bits. Therefore, contents of the PAK sequence number $PAK\_SN_1$ and PMK sequence number $PMK\_SN_1$ may be provided in the authorization key sequence number $AK\_SN_1$ even when the bits of them are added.

As described, since the base station 20 distributes the authorization key sequence number $AK\_SN_1$ to the subscriber station 10 and shares the $AK\_SN_1$ with the subscriber station 10, the subscriber station 10 may indirectly know PMK sequence number $PMK\_SN_1$ by the authorization key sequence number $AK\_SN_1$ distributed by the base station 20. Accordingly, the subscriber station 10 and the base station 20 may share the PMK sequence number $PMK\_SN_1$.

Subsequently, the authorization key identifier $AKID_1$ is used to identify the authorization key instead of using the authorization key sequence number $AK\_SN_1$, and the authorization key identifier $AKID_1$ is generated by using the authorization key sequence number $AK\_SN_1$, the authorization key $AK_1$, the subscriber station MAC address SSID, and the base station identifier BSID, which has been described above, and therefore detailed descriptions will be omitted.

The subscriber station 10 and the base station 20 share the PAK lifetime in the RSA-based authentication process, and share the PMK lifetime in the 3-Way SA-TEK exchange process.

When the RSA-based authorization process and the EAP-based authorization process or the authenticated EAP-based authorization process are performed, the RSA-based re-authentication process or the EAP-based re-authentication process may be independently performed since the previous PAK lifetime and PMK lifetime have independent values.

The RSA-based re-authentication process is performed before the PAK lifetime expires, the subscriber station 10 and the base station 20 may share the new $PAK_2$ and PAK sequence number $PAK\_SN_2$ in the RSA-based re-authentication process, share the new authorization key sequence number $AK\_SN_2$ in the 3-Way SA-TEK exchange process which is subsequently performed after the RSA-based re-authentication process, and use the shared $PMK_1$ and PMK sequence number $PMK\_SN_1$ to generate and share the new authorization key $AK_2$ and the authorization key identifier $AKID_2$.

In addition, when the EAP-based re-authentication process is performed before the PMK lifetime expires, the subscriber station 10 and the base station 20 may share the new $PMK_2$ and PMK sequence number $PMK\_SN_2$ in the EAP-based re-authentication process, share the new authorization key sequence number $AK\_SN_2$ in the 3-Way SA-TEK exchange process which is subsequently performed after the EAP-based re-authentication process, and use the shared $PAK_1$ and PAK sequence number $PAK\_SN_1$ to generate and share the new authorization key $AK_2$ and the authorization key identifier $AKID_2$.

When the various re-authentication processes are performed as described above, the two PAKs $PAK_1$ and $PAK_2$ may be identified by using the PAK sequence numbers $PAK\_SN_1$ and $PAK\_SN_2$, the two PMKs $PMK_1$ and $PMK_2$ may be identified by using the PMK sequence numbers $PMK\_SN_1$ and $PMK\_SN_2$, and the two authorization keys $AK_1$ and $AK_2$ may be identified by using the authorization key identifiers $AKID_1$ and $AKID_2$. The PAK sequence number $PAK\_SN_2$, the PMK sequence number $PMK\_SN_2$, and the authorization key sequence number $AK\_SN_2$ are set to be 4 bits.

The re-authentication processes may be easily understood by referring to FIG. 3 and FIG. 4, and therefore detailed descriptions thereof will be omitted.

As described above, the problems of the respective key identifiers and the PMK lifetime defined in the PKMv2 of the conventional IEEE 802.16e wireless MAN-based portable Internet service are resolved according to the second exemplary embodiment of the present invention. That is, when the lifetime for key is provided in the EAP method protocol, this lifetime is used as the PMK lifetime, but when the lifetime for key is not provided in the EAP method protocol, the lifetime defined by the vendor is used as the PMK lifetime. Therefore, the EAP-based re-authentication may be efficiently performed.

In addition, the efficiency is increased when the identifier is transmitted in the radio link since the sizes of PAK identifier, PMK identifier, and authorization key identifier are reduced from 64 bits to 4 bits.

In addition, the authorization key sequence number for determining the authorization key identifier is generated by the PAK identifier and the PMK identifier, the base station 10 generates the PAK identifier and the PMK identifier so that they are increased by one whenever the authorization key is updated, and the base station allocates the PAK identifier and the PMK identifier to the subscriber station 10, and therefore the two authorization keys may be identified by the authorization key identifier.

When the subscriber station authenticated in the RSA-based authorization or in the EAP-based authorization performs a handover to a new base station 21, the authorization key of the base station 20 providing a current service is different from the authorization key of the new base station 21. The authorization key identifier AKID is used to identify the above different authorization keys. Since the authorization key identifier AKID is generated by using the authorization key sequence number AK_SN, authorization key AK, subscriber station MAC address SSID, and base station identifier BSID, the new base station 21 is not required to additionally perform the RSA-based authorization process or the EAP-based authorization process when the subscriber station 10 finishes the handover. In addition, the handover may be quickly performed since it is not required to allocate the authorization key identifier. That is, when the subscriber station 10 achieves the handover, since the authorization key identifier $AKID_{old}$ of the base station 20 having provided the service is different from the authorization key identifier $AKID_{new}$ of the new base station 21, the new base station 21 is not required to additionally transmit a field for identifying the authorization key to the subscriber station 10, and then the handover process may be quickly performed at the new base station 21.

In addition, when the subscriber station 10 achieves the handover, and the RSA-based re-authentication and the EAP-based re-authentication are not performed between the subscriber station 10 and the base station 21 to which the subscriber station is handed over, the subscriber station 10 uses the authorization key sequence number used by the base station 20 as the authorization key sequence number of the base station 21 to which the subscriber station is handed over.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The effects of the IEEE 802.16 MAN-based wireless portable Internet system according to the exemplary embodiment of the present invention are as follows:

First, when the EAP-based authorization is performed, the EAP-based re-authentication may be efficiently performed since the PMK lifetime is provided from the EAP method protocol or is defined by the vendor.

Second, the respective PAK, PMK, and authorization key may be distinguished since the base station generates the PAK identifier, PMK identifier, and authorization key identifier and transmits them to the subscriber station.

Third, radio resources may be effectively used since the small amount of radio resources are used to transmit the identifiers in a radio link by reducing the size of the PAK identifier, PMK identifier, and authorization key sequence number.

Fourth, according to the second exemplary embodiment of the present invention, the PMK identifier may be automatically known by using the authorization key sequence number without additionally transmitting the PMK identifier since the authorization key sequence number is generated by a combination of the PAK identifier and the PMK identifier.

Fifth, according to the second exemplary embodiment of the present invention, there is a merit in that the authorization key sequence number of a small size is transmitted to identify the authorization key since the authorization key sequence number and the authorization key identifier for the authorization key are separately managed.

Sixth, according to the second exemplary embodiment of the present invention, when the subscriber station successfully performs the handover, a quick handover may be performed at the base station to which the subscriber station is handed over.

What is claimed is:

1. A method of sharing information for identifying an authorization key (AK) with a subscriber station in a base station, the method comprising:
   sharing a root key with the subscriber station by performing an authentication with the subscriber station;
   deriving the AK from the root key;
   sharing an AK sequence number of the AK with the subscriber station, and
   sharing an AK identifier (AKID) of the AK with the subscriber station,
   wherein the AK sequence number is generated by a sequence number of the root key,
   wherein the AKID is generated by a parameter comprising the AK and the AK sequence number, and
   wherein the parameter further comprises a medium access control (MAC) address of the subscriber station and a base station identifier (BSID) of the base station.

2. The method of claim 1, wherein
   the authentication comprises an extensible authentication protocol (EAP) based authentication, and
   the root key is a pairwise master key (PMK).

3. The method of claim 2, wherein the AK sequence number is the same as a PMK sequence number of the PMK.

4. The method of claim 3,
   wherein the PMK sequence number has 4 bits,
   wherein 2 bits among the 4 bits are zero bits, and the other 2 bits are effective bits.

5. The method of claim 1, wherein
   the authentication comprises a Rivest Shamir Adleman (RSA) based authentication, and
   the root key is a primary authorization key (PAK).

6. The method of claim 5, wherein the AK sequence number is the same as a PAK sequence number of the PAK.

7. The method of claim 6, wherein
   the PAK sequence number has 4 bits,
   wherein 2 bits among the 4 bits are zero bits, and the other 2 bits are effective bits.

8. The method of claim 1, wherein
   the authentication comprises an EAP based authentication and a RSA based authentication, and
   the root key comprises a PMK and a PAK.

9. The method of claim 8, wherein the AK sequence number is generated by combining a PMK sequence number of the PMK and a PAK sequence number of the PAK.

10. The method of claim 9,
    wherein the PMK sequence number has 4 bits, 2 bits among the 4 bits of the PMK sequence number are zero bits, and the other 2 bits are effective bits,
    wherein the PAK sequence number has 4 bits, and 2 bits corresponding to the effective bits of the PMK sequence number among the 4 bits of the PAK sequence number are zero bits.

11. The method of claim 9, further comprising:
    sharing a new root key with the subscriber station by performing re-authentication with the subscriber station;
    deriving a new AK from the new root key; and
    sharing an AK sequence number of the new AK with the subscriber station.

12. The method of claim 11,
    wherein a first sequence number of the new root key and a second sequence number of the root key have 8 bits, respectively,
    wherein 4 bits among the 8 bits are zero bits, and the other 4 bits are effective bits, and
    wherein the effective bits of the first sequence number are equal to modulo 16 of a value generated by increasing the effective bits of the second sequence number by one.

13. The method of claim 11,
    wherein a first sequence number of the new root key and a second sequence number of the root key has 4 bits, respectively,
    wherein 2 bits among the 4 bits are zero bits, and the other 2 bits are effective bits, and
    wherein the effective bits of the first sequence number are equal to modulo 4 of a value by increasing the effective bits of the second sequence number by one.

14. A method of sharing information for identifying an authorization key (AK) with a subscriber station after performing an authentication in a base station, the method comprising:
- sharing an AK sequence number of the AK with the subscriber station;
- sharing a PMK sequence number of a pair-wise master key (PMK) with the subscriber station, and
- sharing an AK identifier (AKID) of the AK with the subscriber station,
- wherein the AK is derived from the PMK,
- wherein the AK sequence number is generated by the PMK sequence number,
- wherein the AKID is generated by a parameter comprising the AK and the AK sequence number, and
- wherein the parameter further comprises a medium access control (MAC) address of the subscriber station, and a base station identifier (BSID) of the base station.

15. A method of sharing authentication information with a subscriber station after performing an extensible authentication protocol (EAP) based authentication in a base station, the method comprising:
- sharing a pair-wise master key (PMK) derived by the EAP based authentication with the subscriber station;
- sharing a PMK sequence number of the PMK with the subscriber station;
- deriving an authorization key (AK) from the PMK;
- sharing an AK sequence number of the AK with the subscriber station; and
- sharing an AK identifier (AKID) of the AK with the subscriber station,
- wherein the AKID is generated by a parameter comprising the AK and the AK sequence number, and
- wherein the parameter further comprises a medium access control (MAC) address of the subscriber station and a base station identifier (BSID) of the base station.

16. The method of claim 15,
- wherein the PMK sequence number has 4 bits,
- wherein 2 bits among the 4 bits are effective bits, and the other 2 bits are zero bits.

17. The method of claim 15,
- wherein the AK sequence number is the same as the PMK sequence number.

18. A method of sharing authentication information with a subscriber station after performing a Rivest Shamir Adleman (RSA) based authentication in a base station, the method comprising:
- sharing a primary authorization key (PAK) derived by the RSA based authentication with the subscriber station;
- sharing a lifetime of the PAK with the subscriber station;
- sharing a PAK sequence number of the PAK with the subscriber station;
- deriving an authorization key (AK) from the PAK;
- sharing an AK sequence number of the AK with the subscriber station; and
- sharing an AK identifier (AKID) of the AK with the subscriber station,
- wherein the AKID is generated by a parameter comprising the AK and the AK sequence number, and
- wherein the parameter further comprises a medium access control (MAC) address of the subscriber station and a base station identifier (BSID) of the base station.

19. The method of claim 18, wherein the PAK sequence number has 4 bits,
- wherein 2 bits among the 4 bits are effective bits, and the other 2 bits are zero bits.

20. The method of claim 18,
- wherein the AK sequence number is the same as the PAK sequence number.

21. A method of sharing information for identifying an authorization key (AK) with a subscriber station after performing an authentication in a base station, the method comprising:
- sharing an AK sequence number of the AK with the subscriber station;
- sharing a primary authorization key (PAK) sequence number of a PAK with the subscriber station; and
- sharing an AK identifier (AKID) of the AK with the subscriber station,
- wherein the AK is derived from the PAK,
- wherein the AK sequence number is generated by the PAK sequence number, and
- wherein the AKID is generated by a parameter comprising the AK, the AK sequence number, and
- wherein the parameter further comprises a medium access control (MAC) address of the subscriber station and a base station identifier (BSID) of the base station.

* * * * *